United States Patent
Denton

(10) Patent No.: US 6,710,249 B1
(45) Date of Patent: Mar. 23, 2004

(54) WIRE SEPARATOR

(76) Inventor: Sandra L. Denton, P.O. Box 720700, Pinon Hills, CA (US) 92372

( * ) Notice: Subject to any disclaimer, the term of this patent is extended or adjusted under 35 U.S.C. 154(b) by 0 days.

(21) Appl. No.: 10/243,187

(22) Filed: Sep. 13, 2002

(51) Int. Cl.[7] ................................................ H02G 3/18
(52) U.S. Cl. ................. 174/65 G; 174/65 R; 174/135; 174/152 G; 16/2.2; 248/56
(58) Field of Search .......................... 174/77 R, 138 F, 174/88 R, 65 G, 65 R, 135, 152 G, 153 G; 16/2.1, 2.2; 248/56; 439/604

(56) References Cited

U.S. PATENT DOCUMENTS

| | | | |
|---|---|---|---|
| 3,651,544 A | * | 3/1972 | Soma ........................ 24/16 R |
| 4,366,939 A | | 1/1983 | McMillan |
| 4,494,520 A | | 1/1985 | Hurwitz |
| D278,793 S | | 5/1985 | Smith et al. |
| D284,262 S | | 6/1986 | Finley |
| 4,769,876 A | | 9/1988 | Platt |
| 4,771,743 A | | 9/1988 | McDowell |
| D298,798 S | | 12/1988 | Finley |
| D311,487 S | | 10/1990 | Platt |
| D314,324 S | | 2/1991 | Allison |
| 5,027,478 A | * | 7/1991 | Suhr ........................ 24/16 R |
| 5,168,842 A | | 12/1992 | Brooks |
| 5,179,919 A | | 1/1993 | Foltz, Jr. |
| 5,703,330 A | | 12/1997 | Kujawski |
| D390,447 S | | 2/1998 | Colen, Jr. |
| 5,742,982 A | * | 4/1998 | Dodd et al. ................. 24/16 R |
| 6,012,940 A | | 1/2000 | Wheeler |
| 6,119,668 A | | 9/2000 | Richards et al. |
| 6,328,010 B1 | | 12/2001 | Thurman |
| 6,426,462 B1 | * | 7/2002 | Mignon et al. ........... 174/65 R |
| D462,604 S | | 9/2002 | Denton |

* cited by examiner

*Primary Examiner*—Dhiru R Patel
(74) *Attorney, Agent, or Firm*—Stetina Brunda Garred & Brucker

(57) ABSTRACT

A wire separator capable of maintaining wires in a fixed bundle. The wire separator has an inner member having a plurality of apertures into which wires may be positioned via a plurality of gaps in the inner member. The wire separator also has an outer member capable of attaching to the inner member. Furthermore, the outer member has a slot. When the outer member is in a first position, the slot misaligns with the gaps, thereby maintaining the wires in the inner member and inhibiting wires from inadvertently falling out. In a second position, the slot aligns with at least one of the gaps to thereby facilitate quick removal or insertion of a wire into the wire separator while the other wires remain securely enclosed within the wire separator. Also, the same outer member can attach to different inner members with different numbers of apertures to advantageously reduce costs.

6 Claims, 3 Drawing Sheets

WIRE SEPARATOR

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to wire separators, and more particularly to a modular wire separator that securely bundles and organizes a variety of wires and yet allows for quick wire positioning.

The use of wire separators for organizing wiring is well known in many applications. For instance, vehicle spark plug wire separators are utilized to securely maintain ignition wires in a fixed bundle. Organized as such, the wires are less likely to become accidentally displaced and are also less likely to be damaged from contact with hot engine parts. Similarly, wire separators are used to route other types of wires, such as computer cables, and the wire separators reduce tangling of the cables, reduce the chances of a cable becoming a tripping hazard, and further allow a user to easily identify a particular cable.

Several prior art wire separators have been developed. For example U.S. Pat. No. 5,168,842 issued to Brooks shows a spark plug wiring harness assembly with multiple brackets that are fixedly attached to vehicle engine components. Ignition wires are positioned through apertures in the brackets in order to securely maintain the wires a proper distance from the high temperature engine parts. However, the harness assembly in the Brooks patent has a fixed number of apertures, which limits the number of wires that the harness may hold. Also, as the wires pass through the individual brackets, that portion of the wire is completely enclosed within the bracket, which inhibits the user's ability to quickly change out an individual wire. Furthermore, the brackets are fixed to the vehicle engine, thus limiting the types of applications in which the wiring harness can be used.

Additional wire separators are disclosed within U.S. Pat. No. 5,703,330, issued to Kujawski and U.S. Pat. No. 4,771,743, issued to McDowell. Both of these prior art wire separators include a plurality of apertures into which wires may be positioned, and a slot is included in each aperture to make the apertures partially open. Although the slots allow wires to be quickly replaced, the slots also keep the wires partially exposed, so that they may inadvertently fall out of the open slot and be damaged by contact with a hot engine part.

Moreover, prior art wire separators are disclosed within U.S. Pat. No. 4,769,876 issued to Platt and U.S. Pat. No. D390,447 issued to Colen, Jr. These patents show brackets that include multiple apertures. Both brackets have a seam that runs through the centerline of the apertures, and the bracket can be opened along this seam in order to insert and remove wires from the wire separator. However, the wire separators in these patents, like the wire separator in the Brooks patent, include a fixed number of apertures, which likewise limits the number of wires that the brackets may hold. Furthermore, opening the brackets exposes all wires at once, and this possibly allows a wire to inadvertently escape and fall upon a hot engine part.

From the foregoing, it is apparent that there is a need for a free-floating modular wire separator that securely retains and organizes wires and allows a user to quickly identify and replace an individual wire without compromising the hold on other wires.

BRIEF SUMMARY OF THE INVENTION

The aforementioned needs are addressed by the disclosed wire separator of the present invention. In one aspect, the wire separator comprises an inner member that includes a plurality of generally U-shaped apertures defining associated gaps, wherein individual wires may be positioned through the gaps and into the apertures. The wire separator additionally includes an outer member capable of being releasably attached to the inner member, wherein the outer member can be moved between a first rotational position and a second rotational position. In the first position, the outer member overlaps each gap to thereby prohibit wires from being inserted into or removed from the apertures. In the second position, at least one gap is exposed, allowing a wire to be inserted into or removed from the aperture. As such, one wire can be selectively moved into or out of the wire separator without allowing other wires to inadvertently dislodge from the wire separator. Also, when the outer member is disposed in the first rotational position, all the wires are enclosed within the wire separator. Thus, the wire separator advantageously prohibits a wire from inadvertently falling from the wire separator and being damaged or creating a safety hazard.

In another aspect, a wire separator system is disclosed that comprises a plurality of similarly shaped inner members, each having a differing number of apertures and associated gaps, wherein wires may be positioned into the apertures via the gaps. Also, the wire separator system includes an outer member capable of releasably attaching to each individual inner member separately in a manner such that the outer member overlaps the gaps of the attached inner member when the outer member is in a first position and that exposes at least one gap of the attached inner member when the outer member is in a second position. As such, the wire separator has modular capability and can accommodate more or fewer wires, depending on the desired wiring configuration. Advantageously, the wire separator can be used in a wider variety of applications without having to buy additional outer members.

BRIEF DESCRIPTION OF THE DRAWINGS

These as well as other features of the present invention will become more apparent upon reference to the drawings wherein.

DETAILED DESCRIPTION OF THE INVENTION

Figure 1:
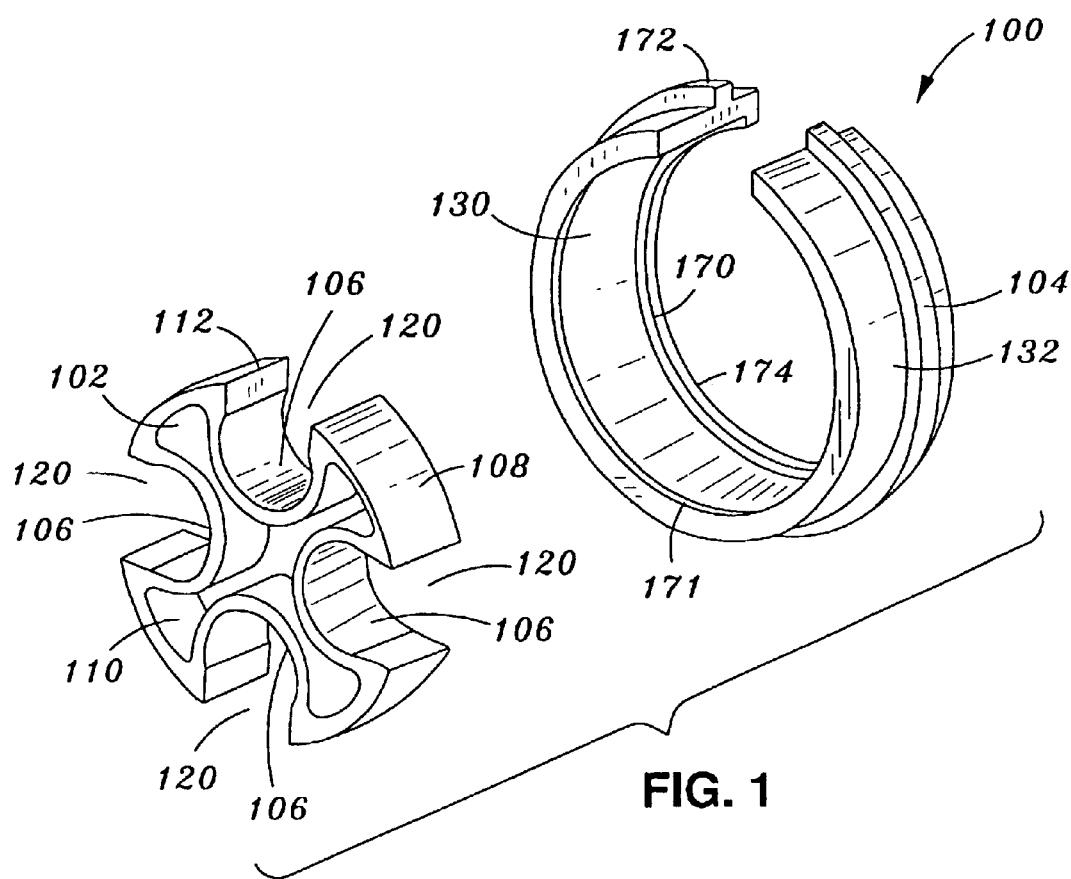
FIG. 1 is an isometric exploded view of a wire separator assembly.
Figure 2:
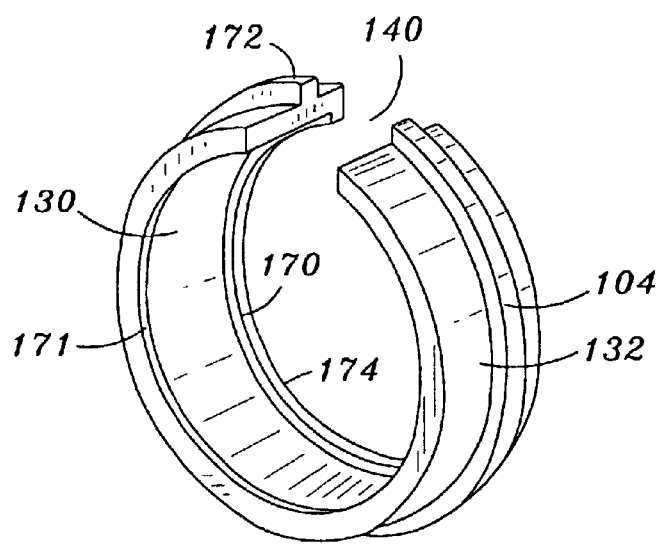
FIG. 2 is an isometric view of an outer ring used in the wire separator assembly shown in FIG. 1.
Figure 3:
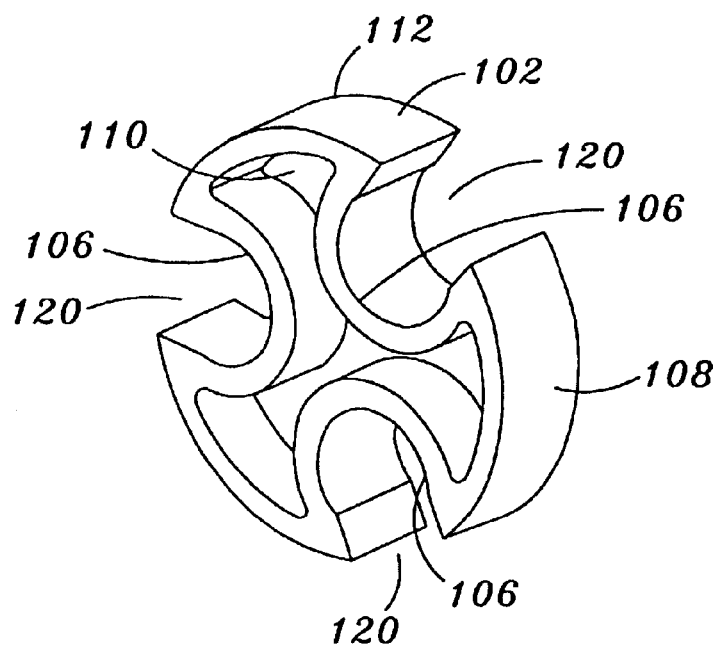
FIG. 3 is an isometric view of a two-aperture inner member capable of being used in the wire separator assembly shown in FIG. 1.

Referring now to the drawings wherein the showings are for purposes of illustrating preferred embodiments of the present invention only, and not for purposes of limiting the same, FIGS. 1 through 4 illustrate various components of a wire separator assembly 100. As shown, the wire separator assembly 100 comprises an inner member 102 and an outer member 104.

Figure 4:
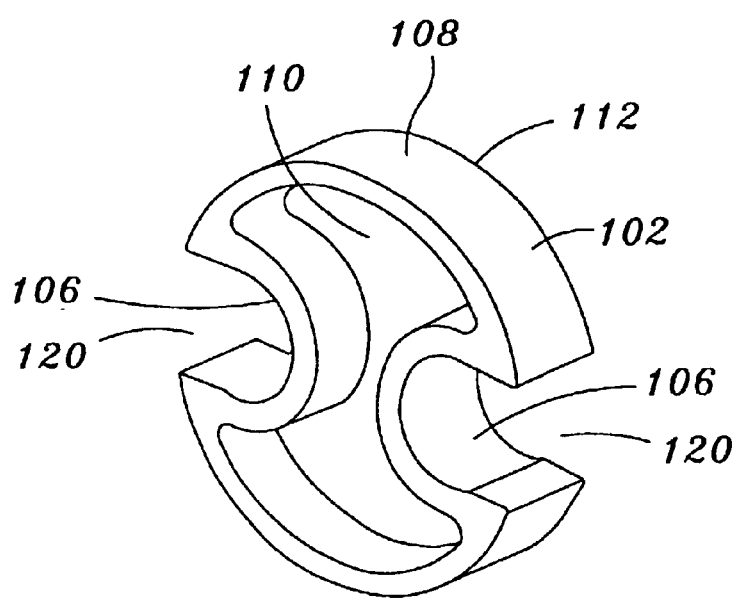
FIG. 4 is an isometric view of a three-aperture inner member capable of being used in the wire separator assembly shown in FIG. 1.

In the embodiments shown, the inner member 102 is generally shaped like a round disk so as to define an outer diameter surface 108, a front face 110, and a back face 112. The inner member 102 also includes a plurality of generally U-shaped apertures 106 extending axially from the front face 110 to the back face 112. In different embodiments, the inner member 102 can comprise four apertures 106 (FIG. 1), three apertures (FIG. 3), or two apertures (FIG. 4). As shown, the individual apertures 106 are preferably symmetrically spaced around the outer diameter surface 108 so as to define several gaps 120 in the outer diameter surface 108. As will be discussed in greater detail, the gaps 120 allow computer wires, spark plug wires, or the like to be inserted into the apertures 106 to be retained in an organized manner.

The outer member 104 is shaped like a ring so as to define an inner diameter surface 130 and an outer diameter surface 132. As with the inner member 102, the outer member 104 is preferably formed with rigid polymer material. The inner diameter surface 130 is formed in a complimentary configuration and is sized to be slightly larger than the diameter of the outer diameter surface 108 of the inner member 102, such that the inner member 102 can be axially inserted within the inner diameter surface 130 of the outer member 104. In the preferred embodiment, the outer member 104 forms an incomplete ring so as to define a slot 140 that extends radially between the inner diameter surface 130 and the outer diameter surface 132. The width of the slot 140 is approximately equal to the arc length of a typical gap 120. As will be discussed in greater detail below, the slot 140 can be aligned with a gap 120 to allow a wire to be selectively moved into or out of the apertures 106 of the inner member 102.

In one embodiment, the outer member 104 further comprises a first annular lip 171 and a second annular lip 170. Both the first lip 171 and the second lip 170 are thin, annular extensions of material extending radially inward from opposite edges of the inner diameter surface 130. In the preferred embodiment, the height of the first lip 171 is such that a user may forcibly move the inner member 102 over the first lip 171 when being axially inserted or removed. In contrast, the height of the second lip 170 is larger than the first lip 171 so as to prevent the inner member 102 from passing over the second lip 170. As such, when the inner member 102 is axially inserted in the outer member 104, the first lip 171 and the second lip 170 interfere with axial movement of the inner member 102, thereby holding the inner member 102 inside the outer member 104.

Also in one embodiment, the outer member 104 further comprises an outer ridge 172. The outer ridge 172 is a band of raised material extending off of the outer diameter surface 132 away from the axis of the outer member 104. The outer ridge 172 acts as a designated point of contact for the wire separator assembly 100. For instance, in the case of ignition wires, the wire separator assembly 100 might come to rest against hot engine components, yet the outer ridge 172 can contact the engine and advantageously keep the wires and other portions of the assembly 100 a safe distance away from the hot components.

Figure 5:
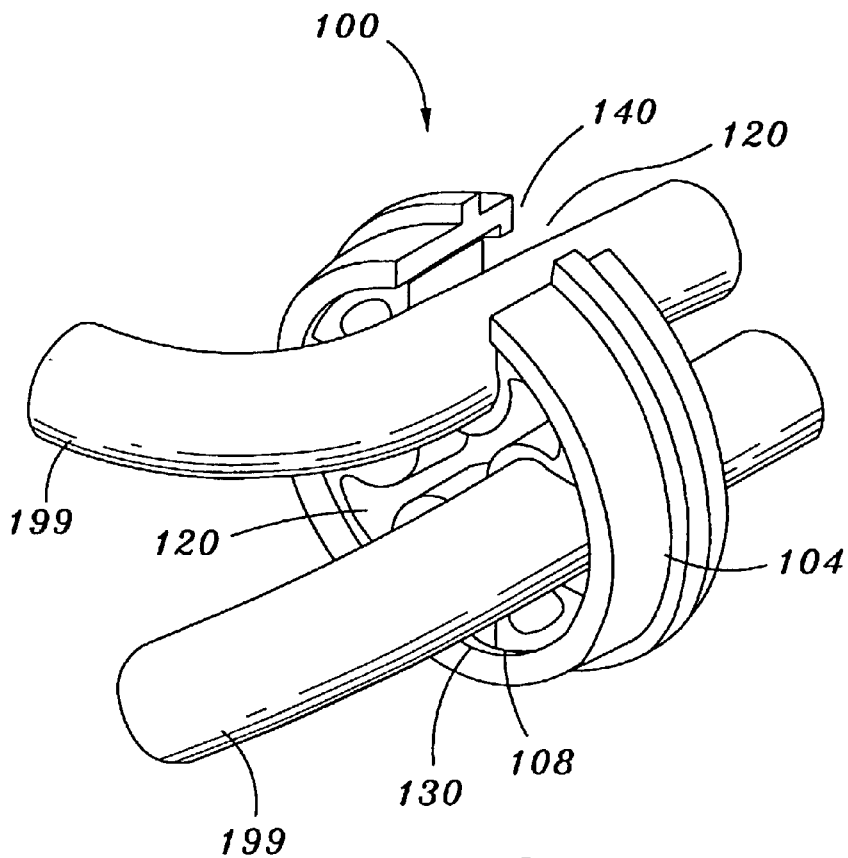
FIG. 5 is an isometric view of an assembled wire separator with wires installed wherein the outer member is set in a second position.
Figure 6:
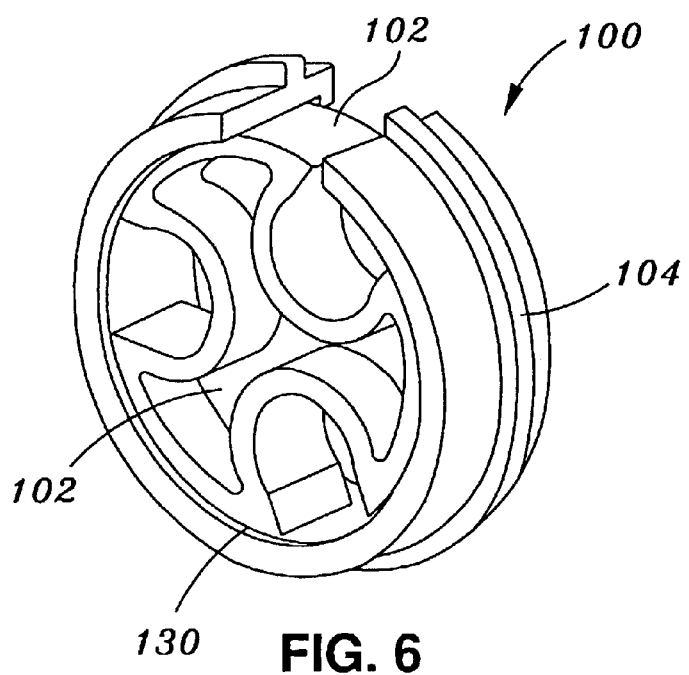
FIG. 6 is an isometric view of an assembled wire separator without wires installed wherein the outer member is set in a first position.

Turning now to FIGS. 5 and 6, the wire separator assembly 100 is shown in its assembled state. As shown, the inner member 102 is inserted axially into the outer member 104 such that the axes of the members 102, 104 are substantially aligned. As stated, the first lip 171 and second lip 170 are sized so as to interfere with the axial movement of the inner member 102 once inserted, and as such, the inner member 102 is retained inside the outer member 104.

As shown in FIG. 5, individual wires 199 can be inserted into the apertures 106 of the inner member 102. In order to insert a wire 199, the outer member 104 is rotated about its axis until the slot 140 is aligned with a gap 120. Then, the wire 199 can be inserted through the gap 120 and into the associated aperture 106. Once the wire 199 is inserted, the outer member 104 is rotated so that the slot 140 aligns with a different gap 120 and a new wire 199 can be inserted. Once all wires 199 are inserted, the outer member 104 is rotated until the slot 140 is misaligned with all gaps 120 as is shown in FIG. 6. As such, outer member 104 overlaps all the gaps 120, and the wires 199 are locked into the wire separator assembly 100. Advantageously, locking the wires 199 as such reduces the chances of a wire 199 inadvertently falling out of the wire separator assembly 100 and causing damage or other hazards.

It should be noted that only one aperture 106 in the inner member 102 is exposed when the slot 140 is aligned with a gap 120. Wires 199 positioned in other apertures 106 remain locked inside the wire separator assembly 100 and are unlikely to escape and cause damage or safety hazards.

It should also be noted that a single outer member 104 is able to engage with separate inner members 102 having differing numbers of apertures 106. This modular feature advantageously allows the wire separator assembly 100 to accommodate changes in wiring configurations. For instance, in the case of computer wiring, when a new wire 199 needs to be added to the bundle, the user can replace the inner member 102 with an inner member 102 that has an additional aperture 106, without having to change the outer member 104. Advantageously, this modularity can reduce costs because a new outer member 104 is likely not needed when new wires 199 are added to the wiring configuration.

Finally, it is noted that the wire separator assembly 100 is free floating. In other words, the wire separator 100 need not be fixed to external components other than the wires 199. As such, those skilled in the art will recognize that the wire separator assembly 100 can be positioned at almost any location along the length of the wiring configuration. Also, those skilled in the art will recognize that multiple separators can be positioned on the same wire bundle because the assembly 100 freely floats. Thus, the assembly 100 is advantageously more versatile because it freely floats.

This disclosure provides exemplary embodiments of a novel wire separator. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A wire separator comprising:
   an inner member including a plurality of apertures and associated gaps, wherein individual wires may be positioned through the gaps and into the apertures; and an outer member capable of releasably attaching to the inner member, wherein the outer member can be moved between a first position, wherein the outer member overlaps each gap to thereby prohibit wires from being inserted into or removed from the apertures, and a second position, which exposes at least one of said gaps and allows a wire to be inserted into or removed from the aperture, the outer member further includes a first and second lip that retain the inner member in the outer member.

2. A wire separator comprising:

an inner member including a plurality of apertures and associated gaps, wherein individual wires may be positioned through the gaps and into the apertures; and an outer member capable of releasably attaching to the inner member, wherein the outer member can be moved between a first position, wherein the outer member overlaps each gap to thereby prohibit wires from being inserted into or removed from the apertures, and a second position, which exposes at least one of said gaps and allows a wire to be inserted into or removed from the aperture, the outer member further includes a ridge located on an outside surface thereof, wherein the ridge acts as a resting surface for the wire separator.

3. A wire separator system comprising:

a plurality of similarly shaped inner members, each having a different number of apertures and associated gaps, wherein wires may be positioned into the apertures via the gaps; and an outer member capable of releasably retaining each individual inner member therewithin separately in a manner that overlaps the gaps of the retained inner member when the outer member is in a first position and that exposes at least one of said gaps of the retained inner member when the outer member is in a second position, the outer member further includes a first and second lip that retain the inner member in the outer member.

4. A wire separator system comprising:

a plurality of similarly shaped inner members, each having a different number of apertures and associated gaps, wherein wires may be positioned into the apertures via the gaps; and an outer member capable of releasably retaining each individual inner member therewithin separately in a manner that overlaps the gaps of the retained inner member when the outer member is in a first position and that exposes at least one of said gaps of the retained inner member when the outer member is in a second position, the outer member further including a ridge located on an outside surface of the outer member, wherein the ridge acts as a resting surface for the wire separator system.

5. A wire separator, comprising:

an inner member comprising a plurality of apertures into which individual wires may be positioned such that a first portion of each wire is surrounded by the inner member and a second portion of each wire is exposed; and an outer member capable of retaining the inner member therein and when the inner member is retained in the outer member, the outer member being capable of moving between a first position, in which the second portion of each wire is covered by the outer member, and a second position, in which the second portion of at least one of said wires is exposed, the outer member further includes a first and second lip that retain the inner member in the outer member.

6. A wire separator, comprising:

an inner member comprising a plurality of apertures into which individual wires may be positioned such that a first portion of each wire is surrounded by the inner member and a second portion of each wire is exposed; and an outer member capable of retaining the inner member therein and capable of moving between a first position, in which the second portion of each wore is covered by the outer member, and a second position, in which the second portion of at least one of said wires is exposed, the outer member further including a ridge located on an outside surface of the outer member acting as a resting surface for the wire separator.

\* \* \* \* \*